United States Patent
Wada et al.

(10) Patent No.: US 6,471,584 B1
(45) Date of Patent: *Oct. 29, 2002

(54) SIMULATION GAME MACHINE

(75) Inventors: Tetsuya Wada, Kakogawa; Yasuyuki Nagatomo, Kobe, both of (JP)

(73) Assignee: Konami Co., Ltd., Hyogo-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/594,390

(22) Filed: Jun. 15, 2000

Related U.S. Application Data (62) Division of application No. 09/197,827, filed on Nov. 23, 1998, now Pat. No. 6,142,870.

(30) Foreign Application Priority Data

Nov. 27, 1997 (JP) .............................. 9-325566

(51) Int. Cl.⁷ .............................................. A63F 13/100
(52) U.S. Cl. ........................................ 463/4; 434/253
(58) Field of Search .............................. 463/4, 7, 8, 31, 463/32, 36; 434/253; 482/71; 472/90; 273/440, 441, 440.1, 459

(56) References Cited

U.S. PATENT DOCUMENTS

| | | | | |
|---|---|---|---|---|
| 4,817,950 A | * | 4/1989 | Goo .......................... | 273/148 B |
| 5,037,303 A | * | 8/1991 | Irwin ........................ | 434/253 |
| 5,049,079 A | | 9/1991 | Furtado et al. | |
| 5,139,261 A | * | 8/1992 | Openiano ................ | 273/148 B |
| 5,423,554 A | * | 6/1995 | Davis ........................ | 273/443 |
| 5,551,701 A | * | 9/1996 | Bouton et al. ............ | 463/36 |
| 5,636,146 A | | 6/1997 | Flentov et al. | |
| 5,713,794 A | * | 2/1998 | Shimojima et al. ...... | 463/36 |
| 5,860,861 A | * | 1/1999 | Lipps et al. .............. | 463/36 |
| 5,886,685 A | * | 3/1999 | Best .......................... | 345/163 |
| 5,987,982 A | * | 11/1999 | Wenman et al. .......... | 434/253 |
| 6,001,017 A | * | 12/1999 | Okano et al. ............ | 463/43 |
| 6,022,272 A | * | 2/2000 | Sano ........................ | 463/36 |
| 6,024,675 A | * | 2/2000 | Kashiwaguchi ........ | 463/36 |
| 6,045,446 A | * | 4/2000 | Ohshima .................. | 463/2 |
| 6,093,105 A | * | 7/2000 | Morihira .................. | 463/38 |
| 6,106,397 A | * | 8/2000 | Phillips .................... | 463/36 |
| 6,132,313 A | * | 10/2000 | Yamaguchi .............. | 463/36 |
| 6,142,870 A | * | 11/2000 | Wada et al. .............. | 463/4 |
| 6,149,523 A | * | 11/2000 | Yamada et al. .......... | 463/31 |

FOREIGN PATENT DOCUMENTS

| | | |
|---|---|---|
| EP | 0792667 | 9/1997 |
| JP | 09000742 | 1/1997 |
| WO | WO96/35494 | 11/1996 |

* cited by examiner

*Primary Examiner*—Rinaldi I. Rada
*Assistant Examiner*—John Paradiso
(74) *Attorney, Agent, or Firm*—Jordan and Hamburg LLP (57) ABSTRACT

A simulation game machine relatively moves a virtual character displayed on a monitor in a game space in accordance with control by a player using an operation unit. The simulation game machine includes a pair of dummy skis, jump switches for instructing the character to initiate jumping, and a jump controller for controlling the character to jump in accordance with an instruction from the jump switches.

14 Claims, 10 Drawing Sheets

SIMULATION GAME MACHINE

This is a division of application Ser. No. 09/187,827, filed Nov. 23, 1998, Now U.S. Pat. No. 6,142,870.

BACKGROUND OF THE INVENTION

1. Field of the Invention

The present invention relates to simulation game machines in which a character displayed on a monitor is relatively moved in a game space in accordance with control by a player using an operation unit.

2. Description of the Related Art

Conventional simulation game machines are known in which a player positions the feet on dummy skis, and a corresponding virtual character virtually skis on a monitor while the player views simulated images displayed on the monitor. In the simulation game machines, the player can virtually experience skiing on a skiing course, and greatly enjoys the game because the time required for the player to travel from a starting point to a goal point, and the score in accordance with the level of skiing, are displayed on the monitor at the end of the game.

In simulation game machines, the player slides the dummy skis horizontally so that the character displayed on the monitor will ski along a skiing course. However, by way of example, at a point where the character must jump while skiing, jumping is automatically performed. This disrupts the virtual experience of the player and makes the experience less realistic. Therefore, the game content is relatively lacking in variety, which may cause the player to lose interest in playing the game.

SUMMARY OF THE INVENTION

Accordingly, it is an object of the present invention to provide a simulation game machine in which a game progresses by using operations similar to those performed in a real skiing competition or other skiing situations, whereby the level of enjoyment for the game player is enhanced.

To this end, according to an aspect of the present invention, the foregoing object has been achieved through provision of a simulation game machine for relatively moving a virtual character displayed on a monitor in a game space in accordance with control by a player using an operation unit, the simulation game machine comprising: a deck on which the player is positioned; instruction means for the deck which instructs a virtual character to initiate jumping; and jump control means for controlling a virtual character to perform the jumping.

Preferably, the deck comprises a pair of dummy skis, and the instruction means is provided on at least one dummy ski.

The instruction means may be a switch provided on a rearward surface of a foot piece included in either ski for either foot of the player so that the movable portion of the switch protrudes.

The jump control means may control a flying distance obtained by the jumping in accordance with the position of the character in the game space, and timing for operating the instruction means.

According to the present invention, a game progresses by using operations similar to those performed in a real skiing competition or other skiing situations, whereby a simulation game machine in which the level of enjoyment for the game player is enhanced is realized.

According to the present invention, a simulation game machine in which a player virtually experiences skiing on a skiing course is realized.

According to the present invention, a game player can virtually experience jumping.

According to the present invention, by operating jump switches at appropriate timing, a flying distance obtained by jumping can be increased to enhance the game quality.

DESCRIPTION OF THE PREFERRED EMBODIMENT

Figure 1:
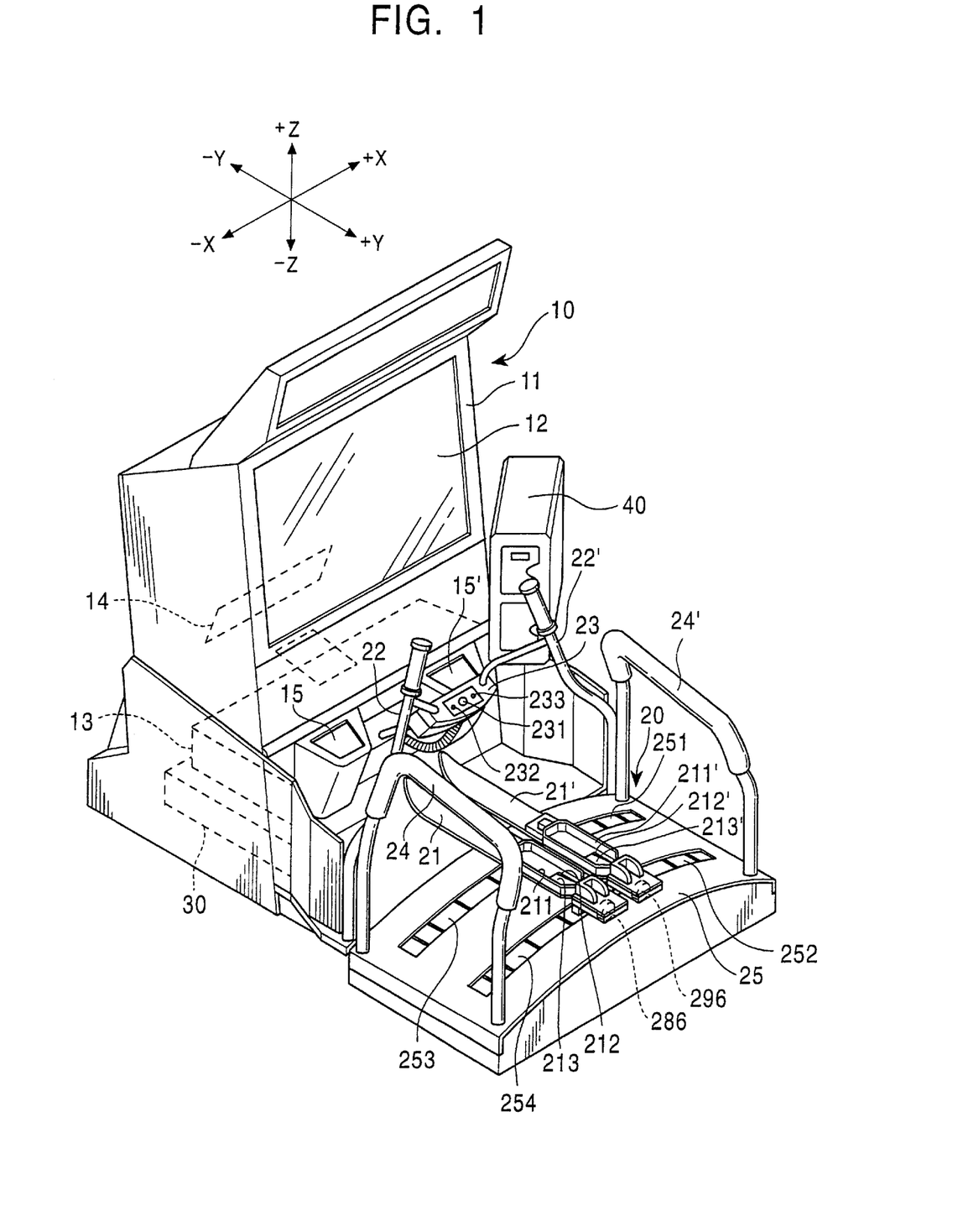
FIG. 1 is an exterior perspective view showing a simulation game machine according to the present invention.

FIG. 1 shows a perspective exterior view of a simulation game machine according to the present invention. FIG. 1 includes X, Y, and Z cartesian-coordinate axes for indicating directional relationships among the components of the simulation game machine.

The simulation game machine includes a monitor 10 for displaying simulated images, an operation unit 20 to be operated by a player, a controller 30 for proceeding with a game in accordance with control by the player using the operation unit 20, and a coin-box unit 40 to which a coin is inserted for starting the game.

The monitor 10 includes a screen 12 provided in the upper part (+Z direction) of one side of a casing 11, a video projector 13 provided in the lower part (-Z direction) of the casing 11, and a reflector 14 provided in the middle part of the casing 11. The video project or 13 projects the predetermined simulated images (game images) of a character wearing skis, a landscape of a skifield, and obstacles such as trees and a hut, onto the screen 12 via the reflector 14. In the front (+Y direction) of the middle part of the casing 11, a pair of speakers 15 and 15' for outputting various effect sounds such as background music in time with the progress of the game is provided. The monitor 10 is provided so that the surface of the screen 12 is diagonally upward, which lowers the overall height of the simulation game machine.

The operation unit 20 includes a pair of dummy skis 21 and 21' provided along the backward and forward direction (Y direction), and a pair of dummy sticks 22 and 22' fixedly provided on the right and left sides (X direction) of the front end direction (-Y direction). Between the dummy sticks 22 and 22', an operation panel 23 supported by them is provided. At ends of the right and left (X direction) sides of the dummy skis 21 and 21', a pair of bars 24 and 24' is provided.

The operation panel 23 has a start button 231, and selection buttons 232 and 233 for selecting the level of difficulty in the game, and selecting, from characters (skiers) prepared beforehand, a character for representing the player. The characters prepared have their own characteristics (e.g., being good at jumping but being weak in sliding, being good at sliding but being weak in edge control, etc.). Accordingly, the player selects a character in accordance with characteristics in the player's skiing operation, whereby the player can advantageously proceed with the game.

The dummy skis 21 and 21' are provided so as to be slid along a pair of long holes 251 and 252 extending in the horizontal direction (X direction) of a top plate 25 formed in a curve in which its central portion projects upward, and so as to be rotated (edge-controlled) around a rotation pivot extending along the backward and forward direction (Y direction) under the dummy skis 21 and 21'. In the long holes 251 and 252 of the top plate 25, shutter members 253 and 254 that can slide in accordance with the sliding of the dummy skis 21 and 21' are provided in order to prevent the player from mistakenly stepping in the long holes 251 and 252.

Figure 2:
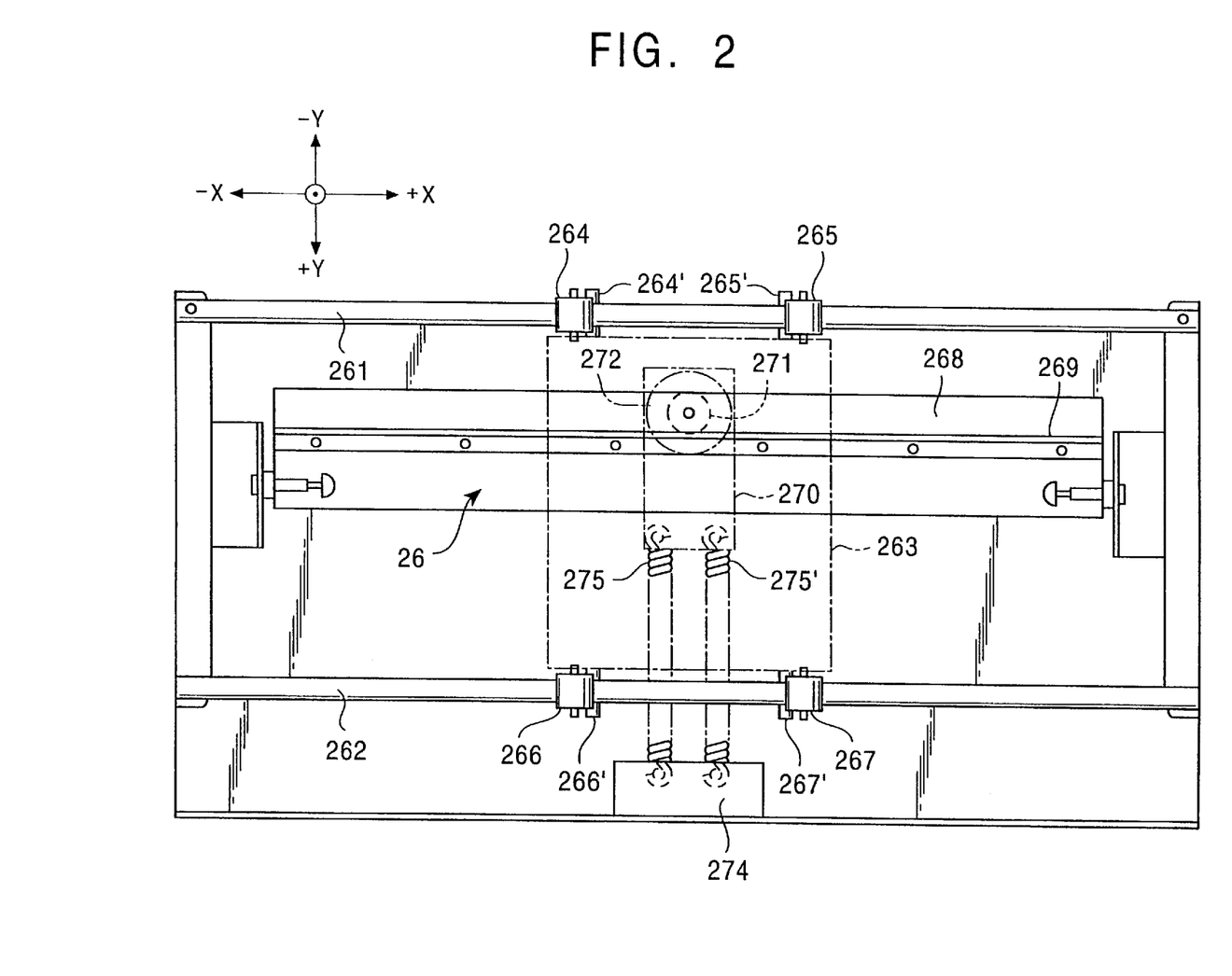
FIG. 2 is a plan view showing the internal structure of an operation unit in the simulation game machine shown in FIG. 1.
Figure 3:
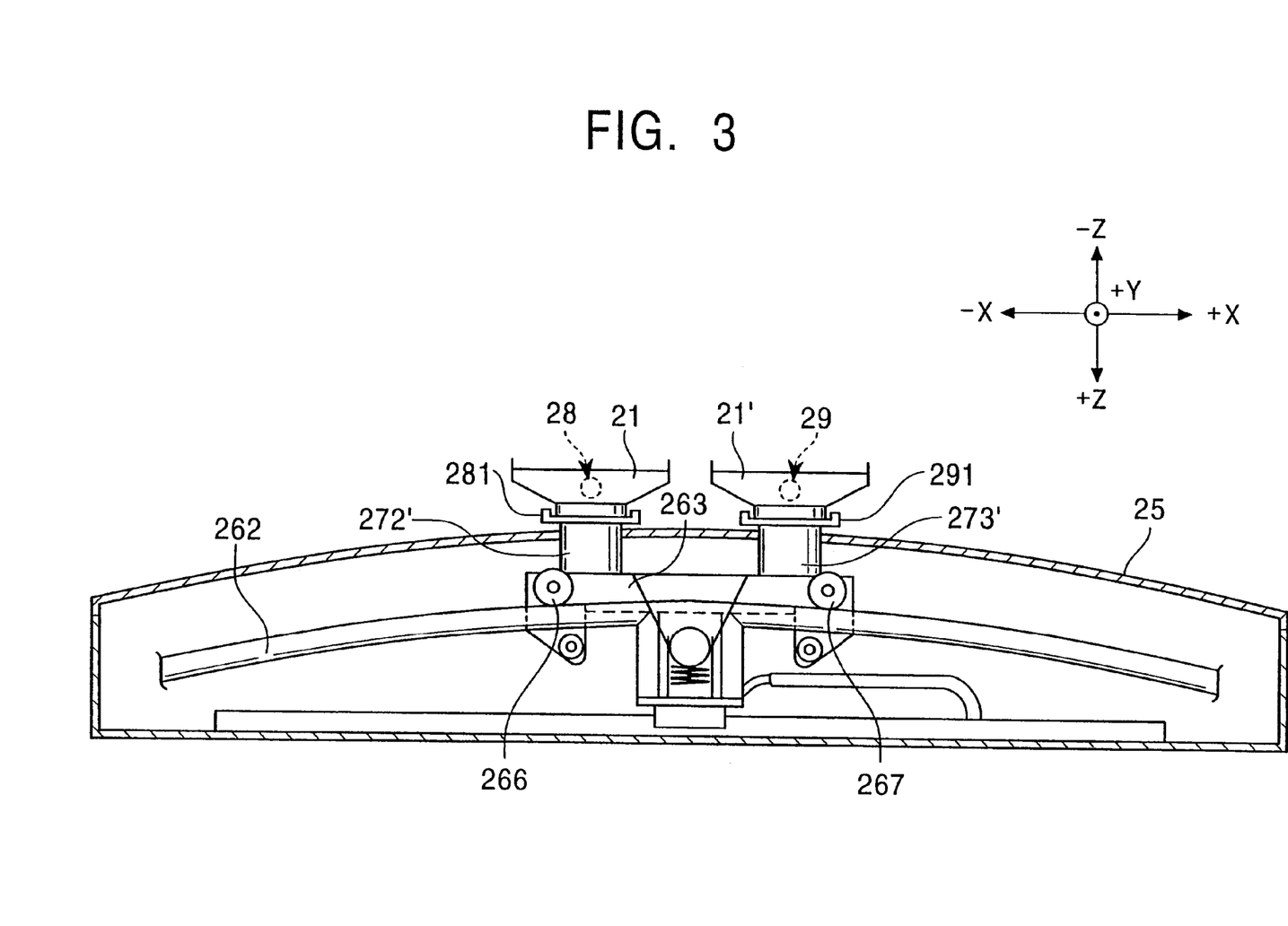
FIG. 3 is a back view showing the internal structure of an operation unit in the simulation game machine shown in FIG. 1.
Figure 4:
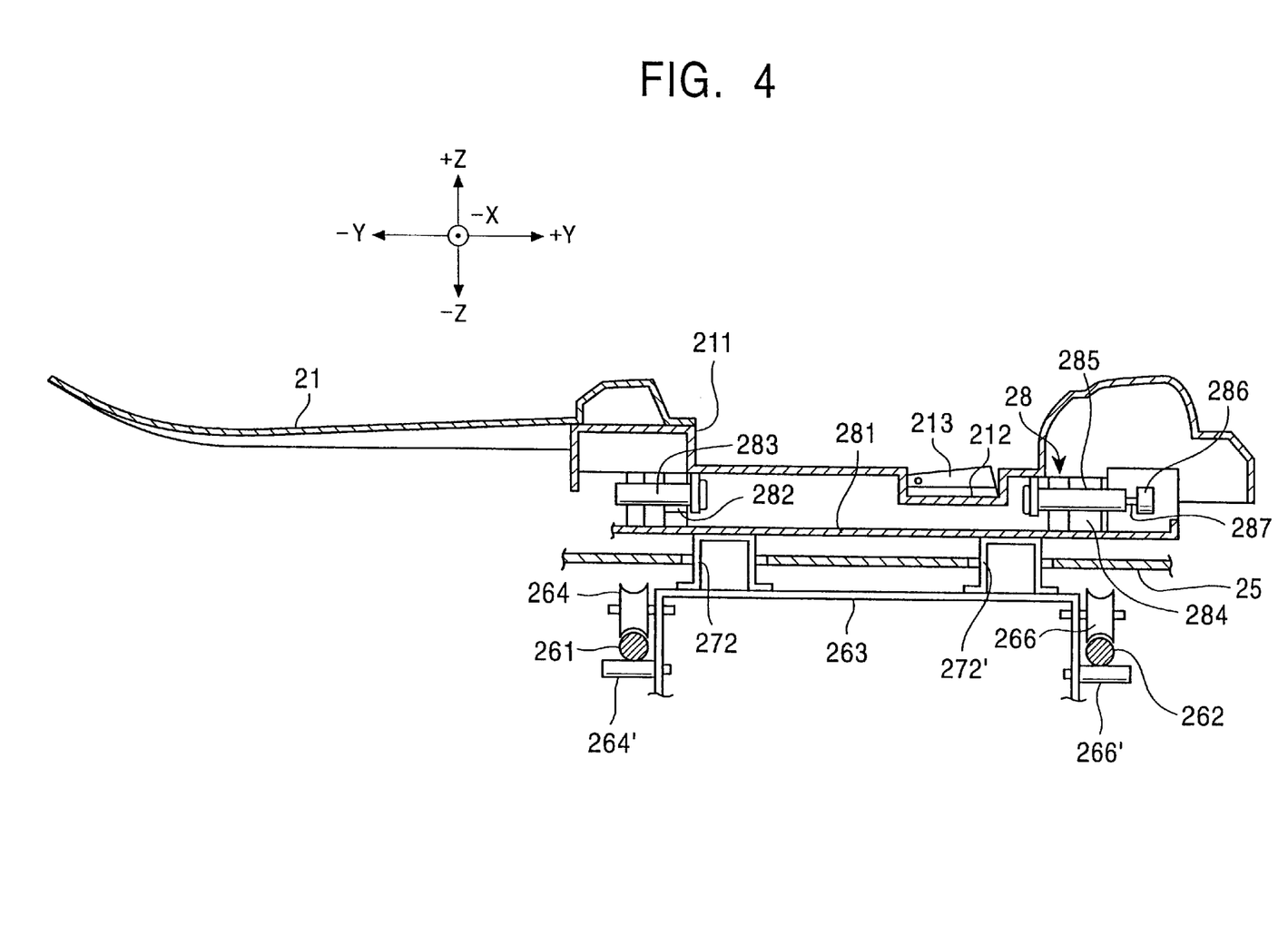
FIG. 4 is a side view showing the internal structure of an operation it n the simulation game machine shown in FIG.

FIGS. 2, 3, and 4 show the internal structure of the operation unit 20, and illustrate a sliding mechanism 26 for enabling the dummy skis 21 and 21' to be slid, a left edging mechanism 28 for enabling the edge control of one dummy ski 21, and a right edging mechanism 29 for enabling the edge control of another ski 21', respectively. FIG. 2 is a plan view, FIG. 3 is a back view, and FIG. 4 is a side view. FIGS. 2, 3, and 4 each include coordinate axes identical to the X, Y, and Z cartesian-coordinate axes shown in FIG. 1 in order to clarify directional relationships among the components of the operation unit 20.

In FIGS. 2, 3, and 4, the sliding mechanism 26 extends along the horizontal direction (X direction), and includes a pair of guide members 261 and 262 provided having a predetermined distance along the backward and forward direction (Y direction), and a sliding supporter 263 provided across the guide members 261 and 262 so as to be slid on the guide members 261 and 262. The guide members 261 and 262 are curvedly formed so that each central portion projects upward. The sliding supporter 263 includes a pair of front rollers 264 and 265 provided on the right and left sides (X direction) of the front portion (−Y direction) of the sliding supporter 263, and a pair of rear rollers 266 and 267 provided on the right and left sides of the rear portion (+Y direction) of the sliding supporter 263. Across the guide member 261, front rollers 264' and 265' for secure engagement are provided so as to be opposed to the front rollers 264 and 265, and across the guide member 262, rear rollers 266' and 267' for secure engagement are provided so as to be opposed to the front rollers 266 and 267.

Between the guide members 261 and 262, a rack supporter 268 is provided along the horizontal direction (X direction), and the rack supporter 268 is provided with a rack 269. The rack 269 engages with a pinion 271 mounted on a setting plate 270 below the sliding supporter 263. The setting plate 270 is provided with a sliding sensor 272 including a rotary encoder rotated such that the pinion 271 moves along the rack 269. The sliding supporter 263 is horizontally slid from the center of the rack 269, whereby the sliding sensor 271 outputs rotation pulses and a direction signal in accordance with the quantity of sliding. The sliding sensor 271 increases or reduces the rotation pulses for each direction, whereby detecting the direction of sliding, and the quantity of sliding. Concerning the sliding sensor 271, variable resistors and potentiometers may be used.

On the sliding supporter 263, a pair of frame members 272 and 272' on which the dummy ski 21 is mounted is provided in the backward and forward direction (Y direction), and a pair of frame members 273 (not shown) and 273' on which the dummy ski 21' is mounted is provided in the backward and forward direction (Y direction). On the pair of frame members 272 and 272', the dummy ski 21 is provided by means of a left edge mechanism 28. On the pair of frame members 273 and 273', the dummy ski 21' is provided by means of a right edge mechanism 29.

The left edge mechanism 28 includes a left supporter 281 mounted on the pair of frame members 272 and 272', a front rotation pivot 283 that is rotatably provided on a supporting member 282 (such as a bearing) mounted on the left supporter 281 in its front and is provided along the backward and forward direction (Y direction), a rear rotation pivot 285 that is rotatably provided on a supporting member 284 (such as a bearing) mounted on the left supporter 281 in its rear portion (−Y direction) and is provided along the backward and forward direction (Y direction). This makes it possible for the dummy ski 21 to rotate (enable edge control) to the right and left around the front and rear rotation pivots 283 and 285.

The supporting member 284 includes a return function in which when the rear rotation pivot 285 rotates, returning force is supplied to the rear rotation pivot 285. Accordingly, in the case where the edge control of the dummy ski 21 is performed, cancellation of the edge control causes the dummy ski 21 to automatically return to its horizontal position. At the back (in +Y direction) of the rear rotation pivot 285, the rotation pivot 287 of the edging sensor 286 including a variable resistor is provided so as to rotate simultaneously with the rotation of the rear rotation pivot 285. Accordingly, the rear rotation pivot 285 rotates to the right and left around the center, whereby a voltage having a magnitude in accordance with the rotation (the quantity of edge control) is output, and the direction and quantity of rotation can be detected based on the voltage. The edging sensor 286 may comprise a rotary encoder or a potentiometer.

The right edge mechanism 29 has the same structure as the left edge mechanism 28. The right edge mechanism 29 includes a right supporter 291 mounted on the pair of frame members 273 and 273', a front rotation pivot (not shown) that is rotatably provided on a supporting member (such as a bearing) (not shown) mounted on the right supporter 291 in its front (−Y direction) and is provided along the backward and forward direction (Y direction), and a rear rotation pivot (not shown) that is rotatably provided on a supporting member (such as a bearing) (not shown) mounted on the right supporter 291 in its front and is provided along the backward and forward direction (Y direction). This makes it possible for the dummy ski 21' to rotate (enable edge control) to the right and left around the front and rear pivots.

The supporting member at the back of the right edge mechanism 29 includes a return function in which when the rear rotation pivot rotates, returning force is supplied to the rear rotation pivot. Accordingly, in the case where the edge control of the dummy ski 21' is performed, cancellation of the edge control causes the dummy ski 21' to automatically return to its horizontal position. At the back (in +Y direction) of the rear rotation pivot, the rotation pivot of an edging sensor 296 (shown in FIG. 1) including a variable resistor is provided so as to rotate simultaneously with the rotation of the rear rotation pivot. Accordingly, the rear rotation pivot rotates to the right and left around the center, whereby a voltage having a magnitude in accordance with the rotation (the quantity of edge control) is output, and the direction and quantity of rotation can be detected based on the voltage. The edging sensor 296 may comprise a rotary encoder or a potentiometer, similarly to the edging sensor 286.

In the dummy skis 21 and 21', feet pieces 211 and 211' (shown in FIG. 1) for receiving the player's feet are concavely formed close to their rear ends. In the feet pieces 211 and 211', concave portions 212 and 212' are formed close to their rear ends (in heel positions). In the concave portions 212 and 212', jump switches 213 and 213' composed of feet switches are provided so that their movable units protrude. Each jump switch 213 or 213' is turned off by the player putting the foot up, and causes the character in the simulated image to jump based on the on-off switching signal.

On a pinion-mounted plate 270, between its rear side (+Y direction) and a fixing member 274 in the center behind it, a pair of tensile coil springs 275 and 275' are provided along the backward and forward direction (Y direction). When the sliding supporter 263 horizontally moves, the tensile coil springs 275 and 275' supply energizing force having a direction in which the sliding supporter 263 returns to its central position. In the tensile coil springs 275 and 275', a gap is formed between two adjacent coils, even if the sliding supporter 263 is not horizontally moved, and is centrally positioned. Accordingly, when the sliding supporter 263 returns from its horizontally moved position to its center, each coil does not touch another to generate no sound caused by contact.

Figure 5:
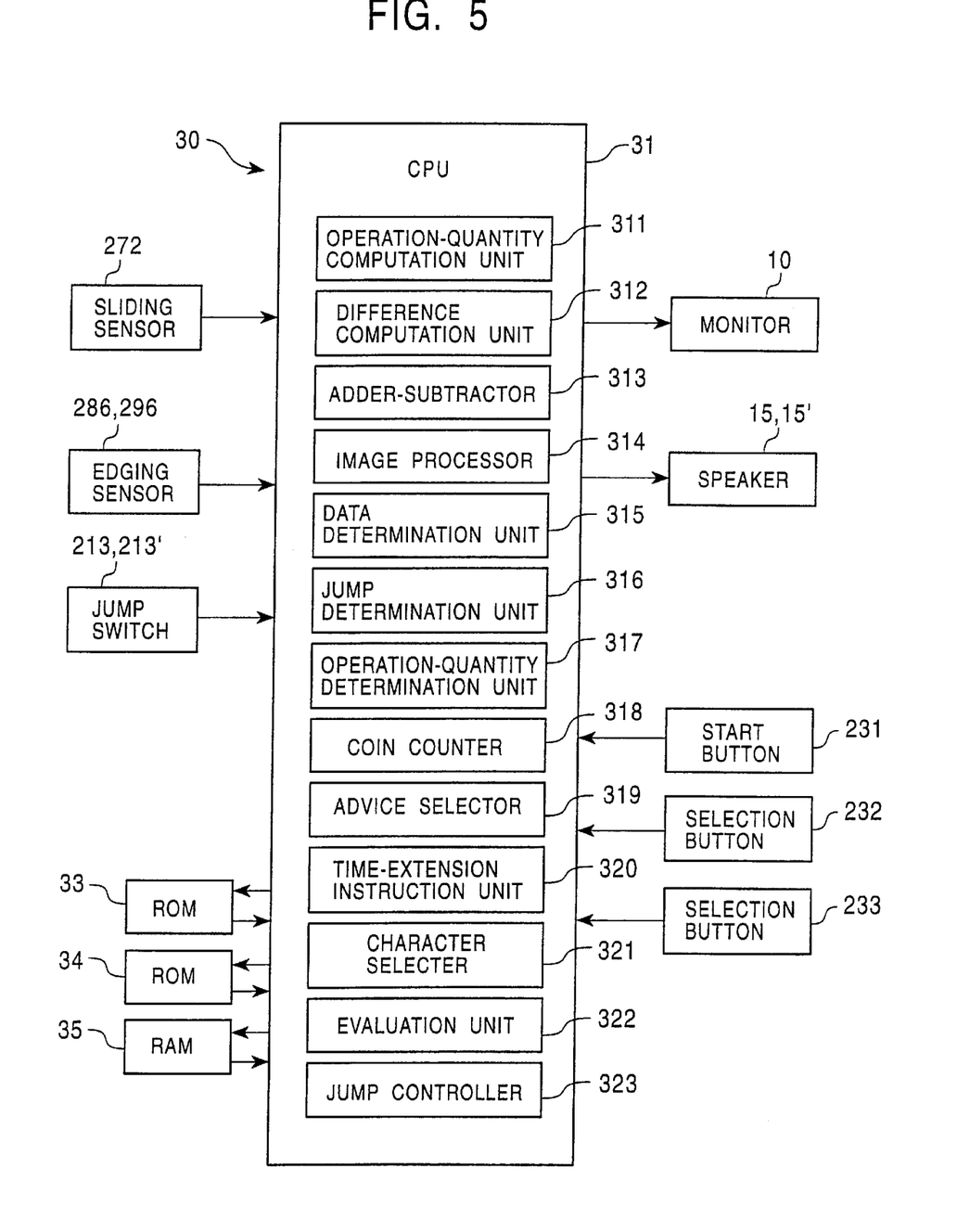
FIG. 5 is a block diagram showing the control structure of the simulation game machine shown in FIG. 1.

As shown in FIG. 5, the controller 30 shown in FIG. 1 includes a central processing unit (CPU) 31 for performing predetermined operations and controlling, a read only memory (ROM) 33 containing control programs for controlling displaying on a monitor 10, a ROM 34 containing various image data such as skiing courses in a skifield, landscapes near courses, and a contestant character operated by a player, and a ROM 35 temporarily containing processed data.

The CPU 31 includes the following function-realizing means: an operation-quantity computation unit 311 for computing differences from base positions, namely, operation quantity, based on rotation pulses, a direction signal from the sliding sensor 272, and detection voltages from edging sensors 286 and 296, which are obtained when the dummy skis 21 and 21' are in the base positions; a difference computation unit 312 for computing changes in the positions of the skiing course and the character last computed from the data computed by the operation-quantity computation unit 311; an adder-subtractor 313 for adding the changes to the last computed data, or subtracting the changes from the last computed data; and an image processor 314 for performing predetermined image processing based on the obtained data. The CPU 31 successively obtains predetermined simulated images by executing the above-described functions every cycle of 1/60 seconds.

The CPU 31 also includes the following function-realizing means: a data determination unit 315 for determining whether the character touches or collides with an obstacle, based on positional data of the character, and positional data of obstacles such as trees, rocks, and a hut; a jump determination unit 316 for determining whether the character has jumped from a jumping hill, or whether the character has jumped at an appropriate timing; an operation-quantity determination unit 317 for determining whether proper sliding and edge control has been performed; a coin counter 318 for counting the number of coins obtained while the character is skiing; an advice selector 319 for selecting an advice in accordance with (negative) evaluations on operating mistakes; a time-extension instruction unit 320 for instructing the extension of a game time in accordance with the obtaining of the coins; a character selector 321 for selecting a character representing the player from characters prepared beforehand; an evaluation unit 322 for evaluating an operating mistake by, for example, comparing each of evaluation factors such as a sliding quantity and an edging quantity with a passing reference value (negative evaluation); and a jump controller 323 for causing the character to jump in accordance with the jump-switch operation.

Figure 6:
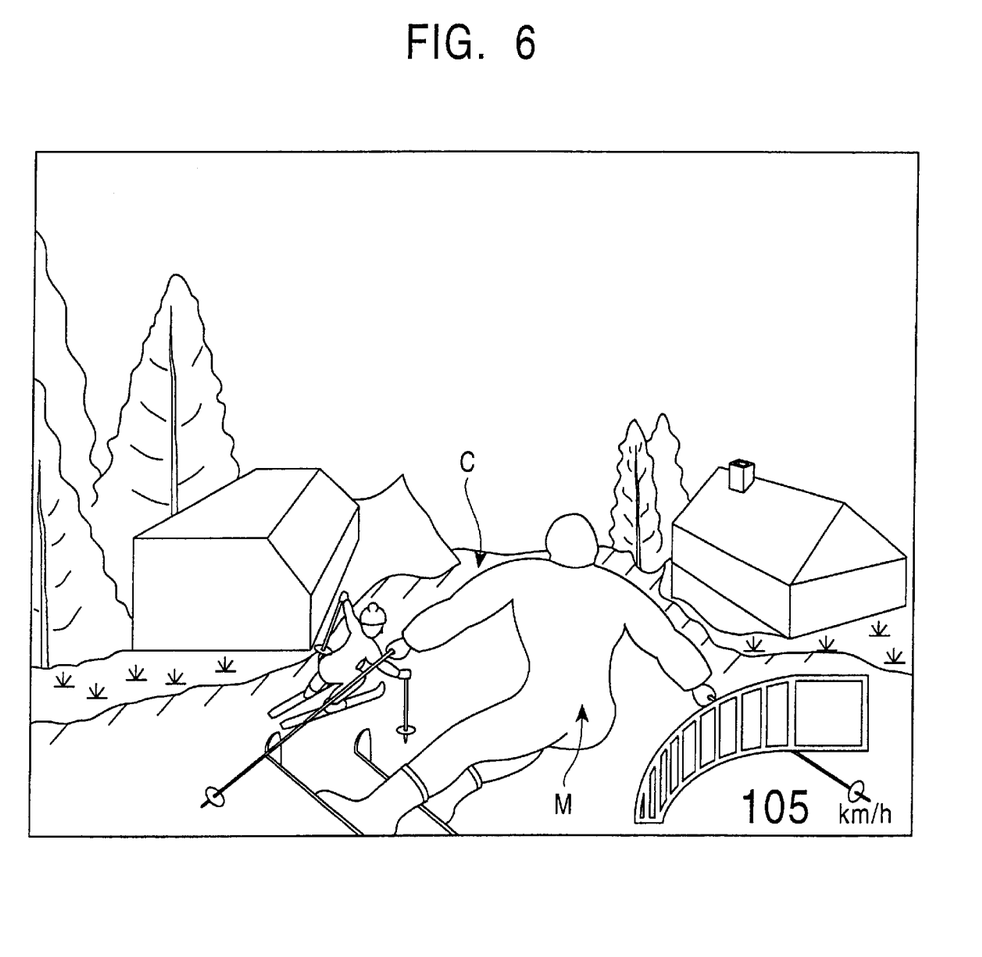
FIG. 6 is a drawing showing a game screen displayed on a monitor.
Figure 7:
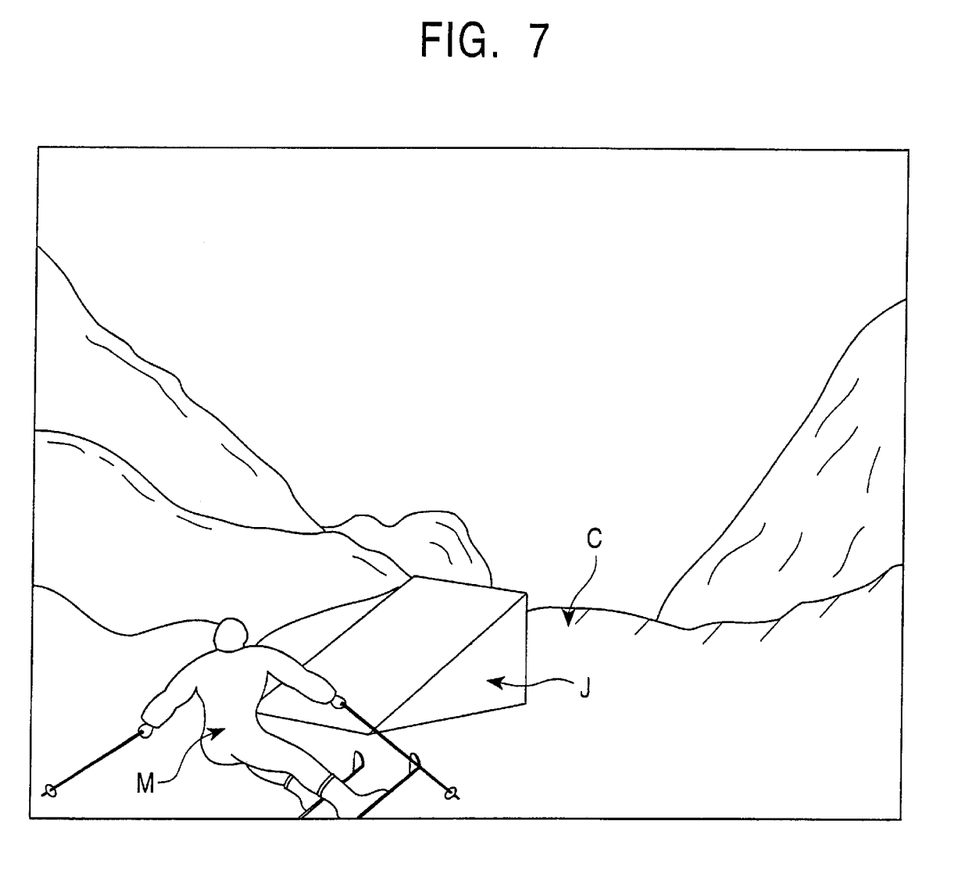
FIG. 7 is a drawing showing a game screen displayed on a monitor.
Figure 8:
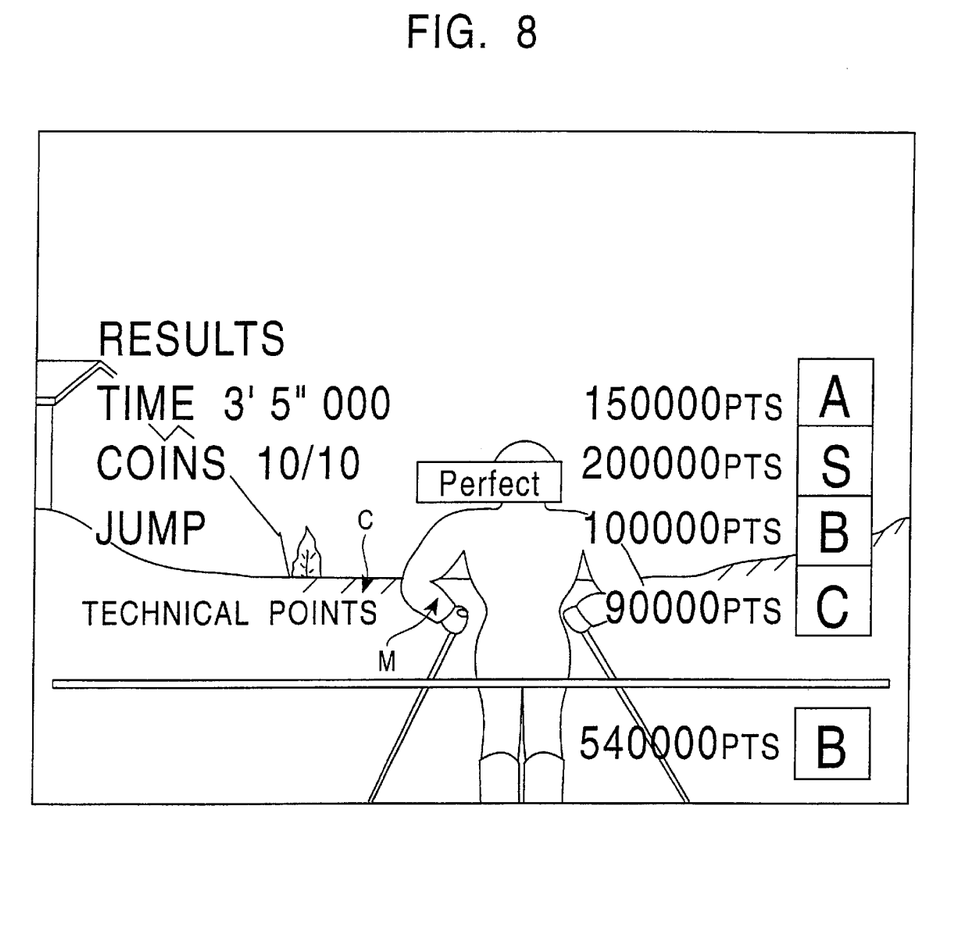
FIG. 8 is a drawing showing a game screen displayed on a monitor.
Figure 9:
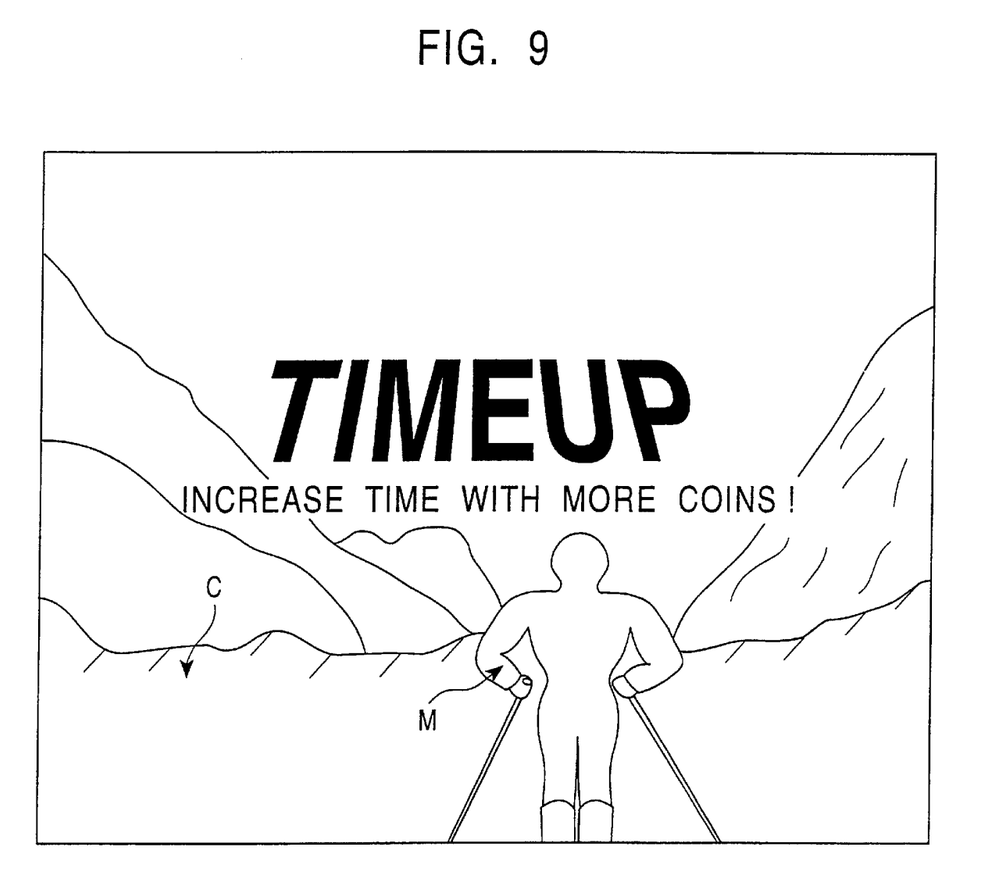
FIG. 9 is a drawing showing a game screen displayed on a monitor.

Next, the contents of a game using the above-described simulation game machine will be briefly described with reference to FIGS. 6 to 9. The game according to this embodiment is a ski game simulating skiing. In this ski game, a player competes as to a time required for character M as a skier travels from a start point to a goal point, a rank, scores obtained in skiing in accordance with operations by the player, etc. FIGS. 6 and 7 show screens in which character M is skiing. FIG. 8 shows a screen appearing when the arrival of character M at the goal point completes the game. FIG. 9 shows a screen appearing when character M fails to arrive at the goal point in a game period preset by character M.

In the game, the player initially puts the feet on the feet pieces 211 and 211' of the dummy skis 21 and 21', inserts a coin into the coin-box unit 40, and turns the start button 231 on. The player operates the selection buttons 232 and 233 for selecting the difficulty levels of the game before turning the start button 231 on to select one level. Successively, the player operates the selection buttons 232 and 233 to select a character for representing the player from characters prepared beforehand before turning the start button 231 on to determine the selected character. Termination of these operations starts the game, and character M starts skiing at a given speed, which is preset in accordance with an inclination from the start point of skiing course C in a skifield to a skiing position.

The player swings both legs to the right and left while gripping the dummy sticks 22 and 22' with both hands, whereby sliding the dummy skis 21 and 21' to the right and left. The player edges the dummy skis 21 and 21' to the right and left, whereby skiing along skiing course C. In the case where skiing course C is a curve, if the player fails in sliding or edge control, character M deviates outside or inside the curve to collide with an obstacle. In this case, score reduction is performed.

On skiing course C, jumping hills J (as shown in FIG. 7) are provided at a plurality of points. When character M reaches jumping hill J, the player puts the heels up at an appropriate timing to turn the jump switches 213 and 213' off, whereby manipulating character M to jump at the appropriate timing in a game space. A flying distance by character M in this jumping is changed in accordance with the position of character M in the game space, and the operation timing of the jump switches 213 and 213'. In other words, by manipulating character M to jump at optimal timing, namely, at a takeoff point, the largest flying distance is obtained. However, if the player fails to manipulate character M to jump at the appropriate timing, the flying distance is limited in accordance with the timing. The jumping is described below.

Since there is a bypass beside the jumping hill J, the player can manipulate character M to pass through the bypass without using the jumping hill J (i.e., when both the jump switches 213 and 213' are turned on). However, by using the jumping hill J to extend the flying distance, character M can be manipulated to reach the goal point faster. In the case where there is an obstacle in the bypass, if the player does not use the jumping hill J, character M collides with the obstacle, which causes score reduction.

In addition, in the middle of skiing course C, coins of plural types in predetermined number are hung at a plurality of points. Accordingly, the player manipulates character M to collides with coins, and obtains the coins. The score is increased in accordance with the types and numbers of the obtained coins. Therefore, by manipulating character M to collide with high-score coins, the player can advantageously proceed with the game. The game time (race time) is extended in accordance with the number of obtained coins. While the game is being played, directed music, music for effects, and the like, are output from the speakers 15 and 15', and provide the game with reality.

Character M, which is skillfully manipulated by the player as described above, finishes skiing when reaching the goal point in the preset game time. At the time, the progress of the game is evaluated (overall). The evaluated results are displayed on the monitor 10 in the form as shown in FIG. 8. The displayed, evaluated results are as follows:

(1) the time required for character M to travel from the start point to the goal point, a score in accordance with the time, and a rank (S, A, B, C, or D) of evaluation in accordance with the score;

(2) the number of coins obtained while character M is skiing, a score in accordance with the number and types of the coins, and a rank (S, A, B, C, or D) of evaluation in accordance with the score;

(3) a score in accordance with timing of jump and the flying distance, and a rank (S, A, B, C, or D) of evaluation in accordance with the score;

(4) a score as technical points given when character M reaches the goal point in a predetermined time, or in accordance with the flying distance by jump, and a rank (S, A, B, C, or D) of evaluation in accordance with the score; and (5) a total (overall evaluation) of the above-described scores, and a rank (S, A, B, C, or D) of evaluation in accordance with the total score.

In addition, if character M has failed to reach the goal point within the game time (i.e., the game is not completed in the preset game time), character M is not allowed to ski then. At this time, causes (i.e., operation mistakes) of incompletion of the game are (negatively) evaluated as to sliding, edge control, jumping, the number of obtained coins, etc. The evaluated results are displayed on the monitor 10 in the form as shown in FIG. 9. The displayed, evaluated results are an indication of "TIMEUP", and an advice for next play in accordance with the negative evaluation. Types of the advice, which are stored in the ROM 34 or the like, are as follows:

(a) Firmly grip the sticks and slide your feet smoothly!;

(b) You can turn rapidly with better edge control!;

(c) Increase time with more coins!;

(d) Grasp jump timing carefully!;

(e) For a superjump, jump at the limit of the jumping hill!;

(f) You may avoid obstacles by jumping!; and (g) Select a character for your skiing style!

Accordingly, the player performs sliding, edge control, etc., paying attention to the advice displayed in the previous play, whereby easily improving in play, even if the player is not accustomed to operation. Thus, the player can manipulate character M to reach the goal point in the preset game time.

Figure 10:
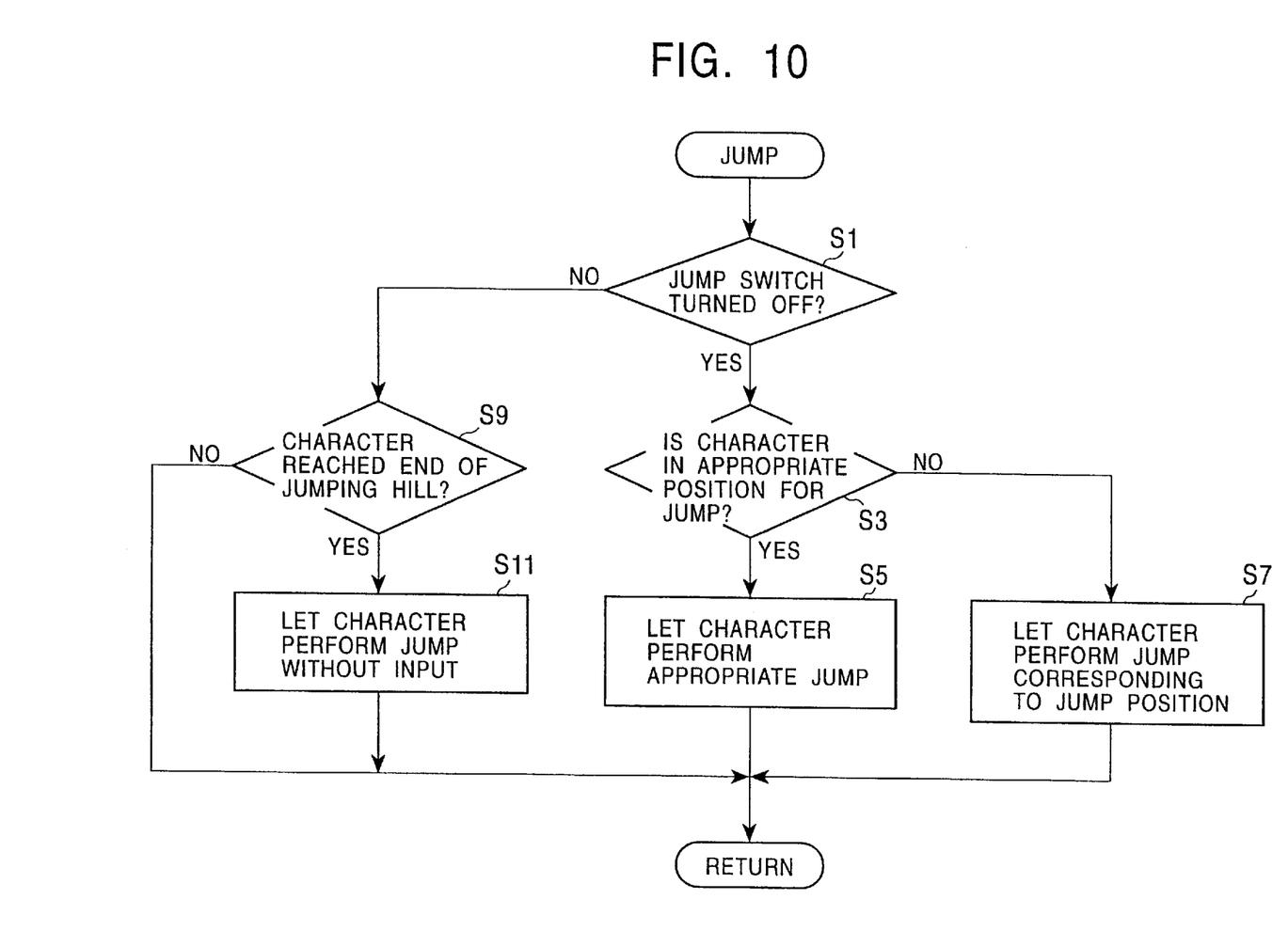
FIG. 10 is a flowchart illustrating a jump process.

Next, a process for jumping will be described with reference to the flowchart shown in FIG. 10. Initially, the process determines whether the jump switches 213 and 213' have changed from on state into off state (step S1). If the process has determined that the jump switches 213 and 213' changed from on state into off state ("YES" instep S1), the process determines whether character M has jumped in an appropriate position (i.e. whether the jump switches 213 and 213' change from on state into off state when character M has reached the takeoff position of the jumping hill J) (step S3). If the process has determined that character M jumped at the appropriate position (i.e., "YES" in step S3.), character M is manipulated to perform optimal jumping (i.e., a jump by which the flying distance is greatest) (step S5).

If the process has determined negatively in step S3 (i.e., when character M is on the side of the takeoff position of the jumping hill J although jump switches 213 and 213' changed from on state into off state), character M is manipulated to jump in accordance with the position of jumping (step S7). In this case, jumping is designed such that as the position of the jump timing is farther from the takeoff position of the jumping hill J, the flying distance is shorter. In the case where the position of the jump timing is at least a predetermined distance away from the takeoff position of the jumping hill J, character M cannot jump, even if the jump switches 213 and 213' are turned on.

In addition, if the process has determined negatively in step S1 (i.e., when the jump switches 213 and 213' are not operated), the process determines whether character M has reached the end of the jumping hill J (step S9). If the process has determined affirmatively, character M is manipulated to jump without an input (step S11). The flying distance by this jump is shortest. When the process ends executing steps S5, S7, and S11, and it determines negatively, it returns to the main routine.

The present invention is not limited to skiing games like the foregoing embodiment, but may be applied to various types of simulation games in which a player can proceed with game play by relatively moving a game image displayed on a monitor in accordance with control by the player. The present invention may be applied to not only games in which a character skis and travels to a goal point being a predetermined distance away from a start point, but also games in which predetermined play (e.g., jumping) is performed in a specified position or a predetermined area.

In the foregoing embodiment, the jump switches 213 and 213' are provided on the dummy skis 21 and 21', and supply a jump instruction to character M when the jump switches 213 and 213' are turned off within a predetermined time. Also, when character M reaches the jumping hill J, and either jump switch 213 or 213' is turned off, jumping may be instructed. In such a case, only either jump switch 213 or 213' may be provided. In the case where the jump switches 213 and 213' are provided on the dummy skis 21 and 21', respectively, as in the foregoing embodiment, using the difference between the two operation timings enables character M to twist, to change the direction of jumping, to have posture in flying, or changing the game. When each of the jump switches 213 and 213' is turned on within a predetermined time, character M may be instructed to jump.

Although the jump switches 213 and 213' are provided on the dummy skis 21 and 21' in the foregoing embodiment, the jump switches 213 and 213' may be provided in the grips of the dummy sticks 22 and 22', with the dummy sticks 22 and 22' regarded as being included in a deck. In this case, instead of the feet switches, push-button switches may be used.

As described above, the present invention provides a simulation game machine for relatively moving a virtual character displayed on a monitor in a game space in accordance with control by a player using an operation unit, the simulation game machine including a deck on which the player is positioned, instruction means for the deck which instructs a virtual character to initiate jumping, and jump control means for controlling a virtual character to perform the jumping. Thus, the player operates the instruction means for the deck, whereby manipulating the character to jump. Thereby, the player performs operations similar to those performed in real skiing, whereby proceeding with the game. Accordingly, a simulation game machine having an enhanced level of enjoyment is realized.

The deck may consist of a pair of dummy skis. The instruction means may be provided on either dummy ski. Such an arrangement enables a game in which skiing is simulated, which realizes a game machine in which the player can virtually experience skiing on a skiing course.

The instruction means may be provided on a rearward surface of the deck (included in the dummy skis) on which the player's feet are positioned so that its movable portion protrudes. In this arrangement, the player can manipulate the character to jump by putting the heels up while gripping the dummy sticks for jumping, whereby virtually experiencing jumping.

The jump control means may control the flying distance by jumping in accordance with the position of the character in the game space, and timing at which the instruction means are operated. In this case, operating the jump switches at optimal timing can increase the flying distance, whereby the game quality can be enhanced.

What is claimed is:

1. A game machine for moving a virtual character displayed on a monitor by a player comprising a deck with a pair of dummy skis on which the player is positioned, jump control means on at least one of said dummy skis for controlling the virtual character to initiate jumping of the virtual character, said jump control means controlling a flying distance for the virtual character in accordance with the timing for operating the jump control means.

2. A game machine according to claim 1, further comprising:
   a foot piece on said at least one dummy ski for receiving a player's foot and wherein said jump control means includes a switch on said foot piece.

3. A game machine according claim 1, wherein said at least one dummy ski is formed with a foot piece for receiving the player's foot and said jump control means includes a switch actuated by player's foot.

4. A game according claim 3, wherein said foot piece is formed with a concave portion in an area close to the rear end of the foot piece and said switch is provided in the concave portion.

5. A game machine according to claim 4, wherein said switch is projected upward from a surface of the foot piece so that the player's foot can press a projected portion of the switch when the foot is received in the foot piece.

6. A game machine according to claim 5, wherein said switch is in an ON state when the projected portion is depressed and said switch is in an OFF state when the projected is portion is free from depression and said jump control means instructs said virtual to initiative jumping when said switch is turned from the ON state to the OFF state.

7. A game machine according to claim 1 wherein said jump control means includes a switch actuatable by the player for instructing the virtual character to initiate jumping.

8. A game machine according to claim 7, wherein said switch has a moveable projected portion having a depressed state when the projected portion is depressed and a non-depressed state when the projected portion is displaced from said depressed state, said jump control means instructing said virtual character to initiate jumping when said projected portion is moved between said two states.

9. A gain according to claim 8, wherein said switch is in an ON state when the projected portion is in said depressed state and said switch is in an OFF state when the project portion is in said non-depress state, said jump control means instructing said virtual character to initiate jumping when said switch is turned from the ON state to the OFF state.

10. A game machine according to claim 1, wherein each of said dummy skis is formed with a foot piece for receiving the player's foot and said jump control means includes switches respectively provided in each of the foot pieces.

11. A game machine according to claim 10, wherein each of said foot pieces is formed with a concave portion and said switches are respectively provided in each of the concave portions.

12. A gain machine according to claim 10, wherein each of said switches is projected upward from a surface of the respective foot piece so that the player's respective foot can press on the projected portion of the switch when the player's foot is received in the foot piece.

13. A game according to claim 1, wherein said foot piece is formed with a concave portion and said switch is provided in the concave portion.

14. A game according to claim 1, wherein said switch has a projected portion which is enabled to be projected upward from a surface of the foot piece so that the player's foot can press on the projected portion of the switch when the foot is received in the foot piece.

* * * * *